F. PROBST.
PROTRACTOR.
APPLICATION FILED OCT. 15, 1908.
935,860.
Patented Oct. 5, 1909.
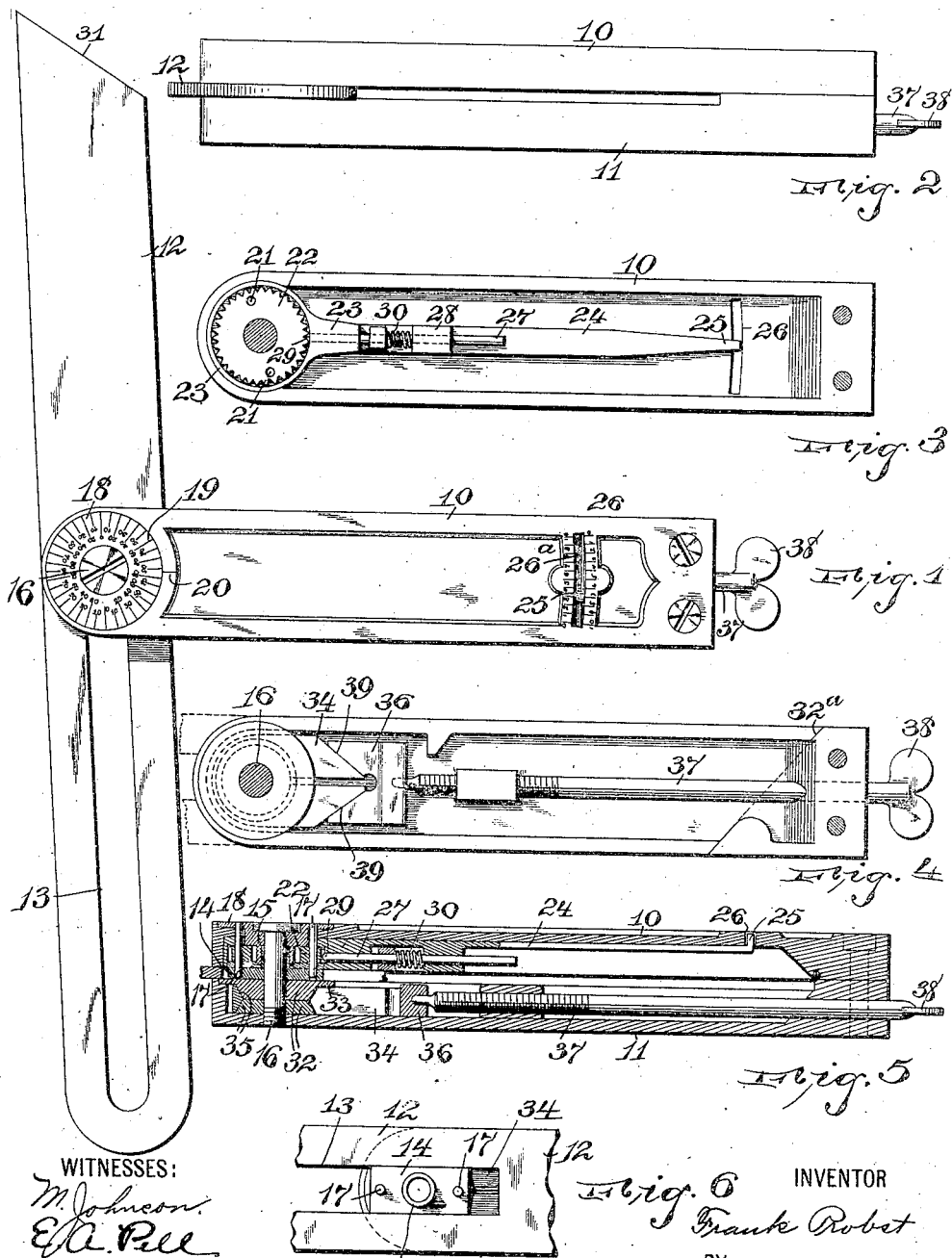

UNITED STATES PATENT OFFICE.

FRANK PROBST, OF ELIZABETH, NEW JERSEY.

PROTRACTOR.

935,860.

Specification of Letters Patent.

Patented Oct. 5, 1909.

Application filed October 15, 1908. Serial No. 457,775.

*To all whom it may concern:*

Be it known that I, FRANK PROBST, a citizen of the United States, residing at Elizabeth, in the county of Union and State of New Jersey, have invented certain new and useful Improvements in Protractors; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a protractor that has a casing in which a blade is pivotally mounted, the blade being adapted to swing, and having, on its hub, a scale to indicate the degree assumed by the blade in its relation with the casing, these marks being preferably one for every ten degrees and adapted to register with a zero mark on the casing, the blade being adapted to swing with one end within the casing, the casing having a stop to limit the entrance of the blade in the casing, whereby they are held in parallel relation.

The device further consists of a means in the casing for locking the blade in any position.

A still further object of the invention is to provide an arm having a pointer projecting up through a slot in the casing, the slot having, on its edges, marks to indicate single degrees or fractions thereof and removed at a considerable distance from the hub of the blade so that the multiplication of the movement, by reason of the long arm, makes the reading of the single degrees and parts thereof an easy matter, and prevents the necessity of supplying the hub with such minute graduations as are now necessary. This arm, with its pointer, is limited by the length of the slot so that when ten degrees have been traversed by the pointer it stops and there is a sliding or step-by-step connection between the arm and the hub of the blade so that the blade can be rotated, but wherever it is stopped the pointer will be in swinging relation therewith. The blade is adapted to slide on its pivot from its center toward one end so that it can be used in any number of situations.

The invention is illustrated in the accompanying drawing, in which—

Figure 1 is a face view of the device. Fig. 2 is a side view, and Fig. 3 is a view looking into the upper member of the casing. Fig. 4 is a face view of the interior of the lower member of the casing. Fig. 5 is a section of all the parts, and Fig. 6 is a detail showing the connection between the blade and its hub, whereby it is rotatably and also slidably connected therewith.

The invention consists of a casing consisting of two members 10 and 11 which are hollowed out on their opposite faces to form chambers. A blade 12 swings between the members of the casing, on one end, and is provided with a slot 13 which fits over a plate 14 shown in Fig. 6, this plate having a flange 15 surrounding the pivotal screw 16, shown more particularly in Fig. 5, this screw also acting to hold the parts together on that end of the protractor. The plate 14 is provided with pins 17 which project up through a hub 18 which turns with the plate 14 and consequently with the blade 12, and has thereon the scale 19 shown in Fig. 1, this scale 19 having its marks adapted to register with a mark 20 on the casing to indicate the degrees established between the blade and the casing in their various positions. These degrees are wide enough apart to be plainly read, and are not made necessarily minute for reasons hereinafter described, since the single or digit degrees are not indicated on the hub. The pins 17 also pass through openings 21 shown more particularly in Fig. 3, these openings being made in a toothed wheel 22 having teeth, the recesses between the teeth being in register with the marks of the scale on the hub 18, that is, there is a tooth between each two marks so that the toothed wheel 22 is in the same constant relation with the hub 18.

Surrounding the toothed wheel and acting as a casing therefor, and being ground to fit into the member 10, is a holder 23 having an arm 24 in extension thereof, the arm 24 ending up in a pointer 25 which projects up into a slot 26 in the casing, preferably in the member 10, this slot being a considerable distance from the center of the pivot of the blade so that the distance increases the movement, and the scale marks 26ᵃ indicating the number of degrees between each of the marks 19 on the hub 18 are easily read. A stem 27 is mounted in a block 28 in the arm 24, and passes into the hub 23 and has a rounded end 29 which is adapted to fit in between the teeth of the wheel 22, but also is adapted to be slid back to allow the teeth to pass over it when the pointer 25 gets to the end of the slot 26 and thereby acts to stop the arm 24. A spring 30 keeps the stem normally with its end in contact with the toothed edge of the wheel 22, and it will be readily seen from this construction that the pointer swings freely with the blade between the ends of the slot, but when it gets to the end of the slot the blade will continue to swing, carrying the toothed wheel 22 with it, and the teeth will ride over the end 29 of the stem 27 until the desired point is reached, when the arm 24 and its pointer 25 will again swing freely with the blade. The blade has a beveled end 31 which, when it is closed, fits against the surface 32ª in Fig. 4, which acts to limit the movement of the blade.

In the member 11 and surrounding the pivotal screw 16 are the two pieces 32 which are in the shape of cones, the upper one having a flange 33, and a yoke 34 with a V-shaped interior surface 35 shown in Fig. 5 fits around the two conical pieces 32. A sliding wedge-shaped piece 36 is pressed toward the pivotal pin by reason of the screw 37 with its thumb-piece 38, and the beveled faces 39 are forced together so that the two conical pieces 32 are forced apart and bind against the plate 14, as shown in Fig. 5, whereby all the parts are locked in position.

This protractor is simple, and is not a construction to get out of order, and has a scale that is very simple to read, since it has no minute sub-divisions on its scale.

Having thus described my invention, what I claim is:—

1. A protractor comprising a casing formed of two members having a slot between them, a blade pivoted in one end of the slot and adapted to swing therein, the opposed faces of the members being recessed, one of the members having a slot concentric to the pivot of the blade and adapted to connect with the recess, a hub turning in the casing and secured to the blade and having graduations thereon to register with the casing, an arm having a pointer thereon to project through the slot, the pointer being adapted to register with the graduations on the casing adjacent to the curved slot, means for causing the arm to swing with the hub, but to be in sliding engagement with the hub when the pointer engages the ends of the curved slot, the arm in its operative connection with the hub being placed in the recess of one member of the casing, and means for locking the hub of the blade, the locking means being placed in the recess of the other member and projecting from the end thereof, and means on the projecting end for the manual manipulation of the locking means.

2. A protractor comprising a casing having a slot therein, a blade to swing from the slot, a hub on the blade having a scale to register on the casing, a toothed wheel on the hub, an arm loosely arranged on the hub and having a pointer on its end adapted to register on the casing, means on the casing to limit the movement of the pointer, a spring actuated stem on the arm engaging the teeth on the wheel, a pair of rings with beveled faces, a split yoke with a V-shaped interior to engage the beveled faces of the rings, a sliding wedge to engage the yoke to compress it, and a manually operated means for sliding the wedge.

3. A protractor comprising a casing, a blade swinging in the casing, a pin in the casing on which the blade is pivoted, rings on the pin having outer beveled faces, a split yoke with a V-shaped interior to engage the beveled faces of the rings, a wedge adapted to slide and having beveled faces to press the yoke together, and means projecting from the casing for manually operating the wedge.

4. A protractor comprising a casing, a blade swinging in the casing, a pin in the casing on which the blade is pivoted, rings on the pin having outer beveled faces, a split yoke with a V-shaped interior to engage the beveled faces of the rings, a wedge adapted to slide and having beveled faces to press the yoke together, means projecting from the casing for manually operating the wedge, a screw bearing on the wedge to force it in one direction, the spring action of the yoke tending to return it, and a means for manually operating the screw on its projecting end.

In testimony, that I claim the foregoing, I have hereunto set my hand this 7th day of October, 1908.

FRANK PROBST.

Witnesses:
ALBERT SORGER,
PAUL C. PRESCHER.